United States Patent
Wojcieson (10) Patent No.: US 8,876,092 B2
(45) Date of Patent: Nov. 4, 2014

(54) MOTOR MOUNTING ASSEMBLY WITH TUNABLE VIBRATION AND NOISE REDUCTION CAPABILITIES

(71) Applicant: Lennox Industries Inc., Richardson, TX (US)

(72) Inventor: Raymond Wojcieson, Carrollton, TX (US)

(73) Assignee: Lennox Industries, Inc., Richardson, TX (US)

( * ) Notice: Subject to any disclaimer, the term of this patent is extended or adjusted under 35 U.S.C. 154(b) by 69 days.

(21) Appl. No.: 13/656,321

(22) Filed: Oct. 19, 2012

(65) Prior Publication Data

US 2014/0110892 A1 Apr. 24, 2014

(51) Int. Cl.
  *F16M 1/00* (2006.01)
(52) U.S. Cl.
  USPC ...... 267/136; 267/140.11; 267/141; 267/153; 248/604; 248/635; 248/638; 417/363
(58) Field of Classification Search
  USPC .......... 267/136, 140.11, 141, 153; 188/378, 188/379; 248/634–638, 560, 562, 603, 604, 248/632; 417/360, 363, 423.15; 180/68.4, 180/291
  See application file for complete search history.

(56) References Cited

U.S. PATENT DOCUMENTS

| | | | | |
|---|---|---|---|---|
| 2,273,869 A * | 2/1942 | Julien | | 267/153 |
| 2,520,757 A * | 8/1950 | Cain | | 248/632 |
| 2,685,178 A * | 8/1954 | Eck | | 62/295 |
| 3,803,690 A * | 4/1974 | Cann et al. | | 29/889.4 |
| 3,926,537 A * | 12/1975 | Piper | | 417/353 |
| 4,210,343 A * | 7/1980 | Shiomi et al. | | 280/124.108 |
| 4,253,634 A * | 3/1981 | Daniels | | 248/604 |
| 4,452,417 A * | 6/1984 | Krafthefer et al. | | 248/604 |
| 4,520,987 A * | 6/1985 | Eguchi et al. | | 248/635 |
| 4,805,868 A * | 2/1989 | Claude | | 248/603 |
| 4,858,880 A * | 8/1989 | Durand | | 248/635 |
| 4,984,971 A * | 1/1991 | Bergeron | | 417/363 |
| 5,449,153 A * | 9/1995 | Catalano et al. | | 267/141.4 |
| 5,492,456 A * | 2/1996 | Knight et al. | | 417/360 |
| 6,029,942 A * | 2/2000 | Daddis et al. | | 248/635 |
| 6,278,209 B1* | 8/2001 | Rupp et al. | | 310/91 |
| 6,354,558 B1* | 3/2002 | Li | | 248/615 |
| 6,820,908 B1* | 11/2004 | Tousi et al. | | 296/35.1 |
| 2009/0273127 A1* | 11/2009 | Goudie | | 267/140.5 |

* cited by examiner

*Primary Examiner* — Thomas J. Williams
*Assistant Examiner* — Mariano Sy (57) ABSTRACT

A mounting assembly comprising an inner mounting sleeve having a cylindrical shank, wherein an end of the mounting sleeve is configured to be mounted to a support structure of a motorized device. The assembly comprises an inner grommet having a cylindrical shank, an axial opening of the inner grommet shank configured to accommodate the mounting sleeve shank there-through. The assembly comprises an outer ring sleeve having a cylindrical shank, the outer ring sleeve disposed around a portion of the inner grommet shank, the outer ring sleeve shank configured to accommodate an eyelet of a mounting arm there-around. The assembly comprises an outer grommet having a cylindrical shank, an axial opening of the outer grommet shank configured to accommodate the inner grommet shank there-in.

19 Claims, 6 Drawing Sheets

MOTOR MOUNTING ASSEMBLY WITH TUNABLE VIBRATION AND NOISE REDUCTION CAPABILITIES

TECHNICAL FIELD

This application is directed, in general, to mounting assemblies and, more specifically, to assemblies for mounting motors.

BACKGROUND

Motors used to operate devices in space conditioning systems or other mechanical systems can vibrate at frequencies which can excite the rest of the system, and result in system vibration as well as associated noise. This condition can be particularly objectionable when motor vibration frequencies are the same as the natural frequencies of the system or components of the system.

SUMMARY

One embodiment of the present disclosure is a mounting assembly. The assembly comprises an inner mounting sleeve having a cylindrical shank, wherein an end of the mounting sleeve is configured to be mounted to a support structure of a motorized device. The assembly comprises an inner grommet having a cylindrical shank, an axial opening of the inner grommet shank configured to accommodate the mounting sleeve shank there-through. The assembly comprises an outer ring sleeve having a cylindrical shank, the outer ring sleeve disposed around a portion of the inner grommet shank, the outer ring sleeve shank configured to accommodate an eyelet of a mounting arm there-around. The assembly comprises an outer grommet having a cylindrical shank, an axial opening of the outer grommet shank configured to accommodate the inner grommet shank there-in.

Another embodiment of the present disclosure is a method mounting a motorized device using a mounting assembly. The method comprises positioning a portion of a cylindrical shank of an inner grommet within an outer ring sleeve having a cylindrical shank, the outer ring sleeve disposed around the portion of the inner grommet shank. The method comprises passing the outer ring sleeve shank and the inner grommet shank through an eyelet opening of a mounting arm, wherein the shank of the outer ring sleeve is adjacent to the eyelet opening.

Another embodiment of the present disclosure is a method of manufacturing a mounting assembling. The method comprises forming an inner mounting sleeve having a cylindrical shank, wherein an end of the inner mounting sleeve is configured to be mounted to a support structure of a motorized device. The method comprises forming an inner grommet having a cylindrical shank, an axial opening of the inner grommet shank configured to accommodate the mounting sleeve shank there-through. The method comprises forming an outer ring sleeve having a cylindrical shank, the outer ring sleeve disposed around a portion of the inner grommet shank, the outer ring sleeve shank configured to accommodate an eyelet opening of a mounting arm there-around. The method comprises forming an outer grommet having a cylindrical shank, an axial opening of the outer grommet shank configured to accommodate the inner grommet shank there-in.

BRIEF DESCRIPTION

Reference is now made to the following descriptions taken in conjunction with the accompanying drawings, in which.

DETAILED DESCRIPTION

The term, "or," as used herein, refers to a non-exclusive or, unless otherwise indicated. Also, the various embodiments described herein are not necessarily mutually exclusive, as some embodiments can be combined with one or more other embodiments to form new embodiments.

The embodiments of the present disclosure benefit from an examination of how the energy transmitted from a motor of a mechanical system can be dissipated or amplified. Energy transmission and its suppression depend on the characteristics and arrangement of the components of the system, such as mounting assemblies, support structures and housings. The use of grommets in mounting assemblies are very important for suppressing vibration and associated pure acoustic tones, but, their implementation can be problematic. Although the properties of grommets can be adjusted to suppress specific vibrational frequencies, multiple frequencies being generated by a motor are more difficult to suppress because material properties of the grommet may limit the effective range of vibration suppression. Another concern is damage to grommets or other components, pre-installed in a mounting assembly of a system, e.g., due to forces encountered during shipping of the system, but not necessarily encountered when the system is installed and operating on-site. Still another concern is irreversible changes to the mechanical properties of grommet material, e.g., from long-term creep induced deformation, due to loads being applied to the grommets over the life of the system, e.g., from weight of the motor components of the system. Such irreversible changes can cause device components of the system or the entire system to have decreased performance and even fail, e.g., due to misalignment of the device components.

Embodiments of the present disclosure address these problems by providing a motor mounting assembly which includes an inner mounting sleeve, inner grommet, outer ring sleeve and outer grommet. The interactions between the positioning, shape and relative dimensions of these parts in the assembly provide a set of previously unrecognized result-effective variables that allow for the tunable suppression of multiple vibrational frequencies, while at the same time mitigating shipping damage and long-term irreversible property changes to the grommets.

Figure 1:
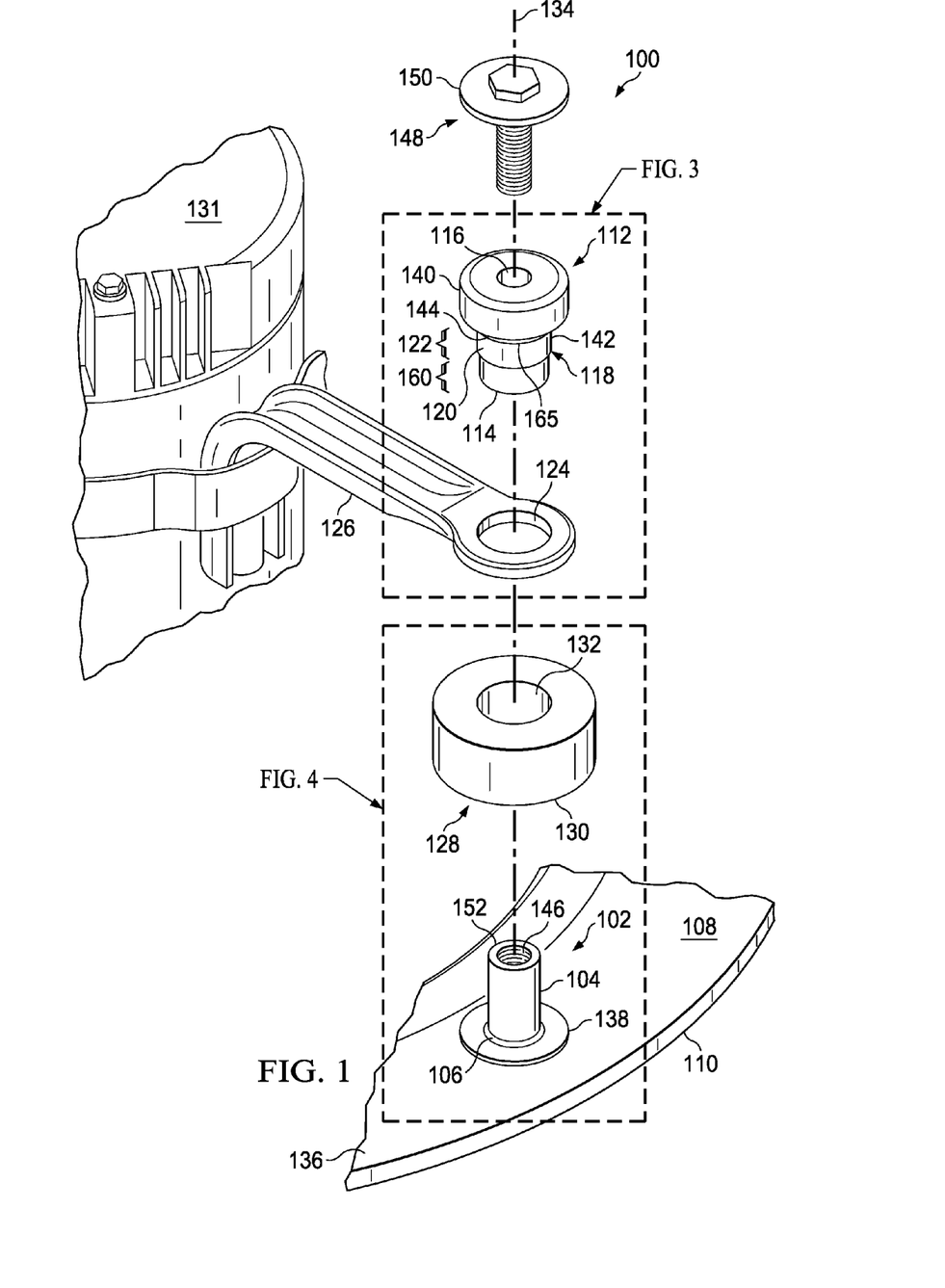
FIG. 1 illustrates exploded isometric view of an example motor mounting assembly of the disclosure.

One embodiment of the present disclosure is a mounting assembly. FIG. 1 illustrates exploded isometric view of an example motor mounting assembly 100 of the disclosure. The assembly 100 comprises an inner mounting sleeve 102 having a cylindrical shank 104. An end 106 of the mounting sleeve 102 is configured to be mounted to a support structure 108 of a motorized device 110. The assembly 100 also comprises an inner grommet 112 having a cylindrical shank 114, an axial opening 116 of the inner grommet shank 114 configured to accommodate the mounting sleeve shank 104 there-through. The assembly 100 also comprises an outer ring sleeve 118 having a cylindrical shank 120, the outer ring sleeve 118 disposed around a portion 122 of the inner grommet shank 114, the outer ring sleeve shank 120 configured to accommodate an eyelet 124 of a mounting arm 126 there-around. The assembly 100 further comprises an outer grommet 128 having a cylindrical shank 130, an axial opening 132 of the outer grommet shank 130 configured to accommodate the inner grommet shank 114 there-in.

Without limiting the scope of the disclosure by theoretical considerations, the outer ring sleeve 118 is thought to help to minimize deformations and damage to the inner grommet shank 114, due to any or all of various forces encountered during shipping, during the operating of a motor 131 that the mounting arm 126 is connected to, and, due long-term creep. It particular, the outer ring sleeve is thought to absorb vibration energy applied in an axial direction (e.g., in some cases substantially along a direction 134 normal to the outer surface 136 of the support structure 108) and redistributes this energy to the inner grommet 112 thereby enabling more effective energy absorption and prevention of damage to the grommet 112.

In some embodiments the outer ring sleeve 118 composed of a material (e.g., aluminum, steel or hard plastic) having sufficient durability to withstand forces applied to it without failure and with properties which will suppress vibrations at frequencies different than those that the inner and outer grommets 112, 128 are most effective in suppressing, thus providing a wider range of vibration suppression capabilities.

As indicated above, the outer ring sleeve shank 120 is configured to accommodate an eyelet 124 of a mounting arm 126 there-around. Such a configuration mitigates damaging high amplitude impact forces and low frequency vibratory forces imparted to the inner grommet 112 during shipping. The outer ring sleeve 118 is thought to redistribute these loads to the grommet 112 in addition to protecting the grommet from abrasion and tearing. Such loads are thereby directed to the grommet ring sleeve 118 in a generally axial direction 134 which is less destructive and more effective in absorbing the energy of these loads.

As further illustrated in FIG. 1, in some embodiments the inner mounting sleeve 102 further includes a cylindrical flange 138 on the one end 106 that is configured to be mounted to the support structure 108. The inner mounting sleeve flange 138 is configured to contact an outer surface 136 of the support structure 108. The inner mounting sleeve 102 and flange 138 (when present) are preferably composed of a rigid strong material (e.g., aluminum, steel or hard plastic) and the flange 138 helps ensure that the assembly 100 remains substantially normal (e.g., 90±10 degrees to the outer surface 136. The flange 138 also helps limit bending of the assembly 100. The shape of the inner mounting sleeve flange 138 can be adapted to match the shape of the outer surface 136 to improve mounting stability. For instance, when the outer surface 136 is a planer surface the flange 138 preferably has a planar shape.

As also illustrated in FIG. 1, in some embodiments, the inner grommet 112 includes a cylindrical flange 140 on an end of the inner grommet shank 114 that is distal to the end 106 of the inner mounting sleeve 102 that is configured to be mounted to the support structure 108. The inner grommet flange 140 helps capture and absorb forces imparted from the motor mounting arm 126.

As further illustrated in FIG. 1, in some embodiments, one end 142 of the outer ring sleeve 118 includes a collar 144. The outer ring sleeve 118 is situated in the assembly 100 (e.g., around the inner grommet shank 114) so that the one end 142 with the collar 144 is distal the end 106 of the inner mounting sleeve 102 that is configured to be mounted to the support structure 108. The inner ring sleeve collar 144 preferably contacts and stabilizes the inner grommet cylindrical flange 140 and the flanges 140 and collar 144 cooperate to absorb forces imparted from the motor mounting arm 126. Additionally, the collar 144 helps to prevent the mounting arm 126 from tearing or stretching the inner grommet cylindrical flange 140.

Figure 2:
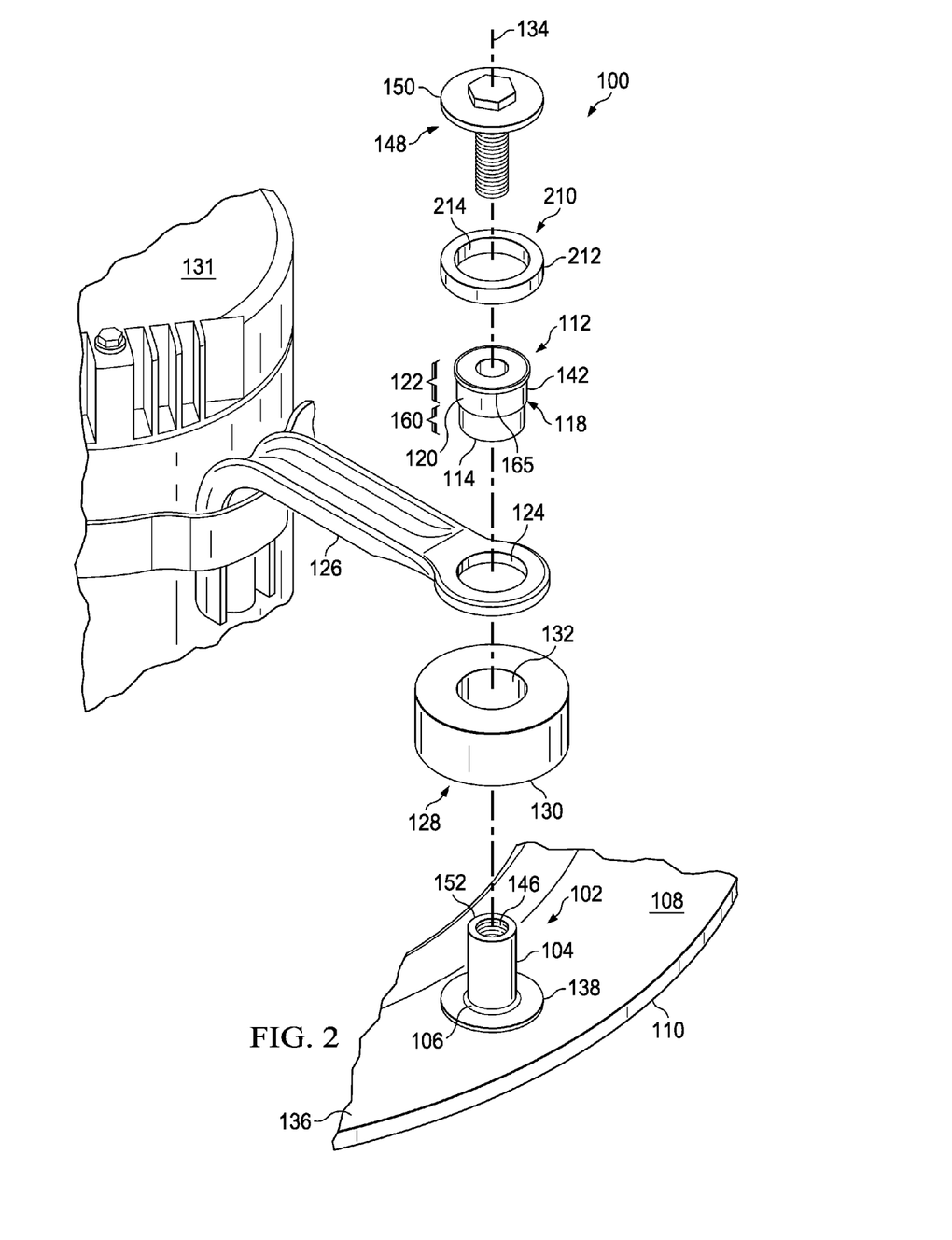
FIG. 2 illustrates exploded isometric view of another example motor mounting assembly of the disclosure.

In some cases, however, the inner grommet 112 has no flange. Such an embodiment is presented in FIG. 2 which illustrates exploded isometric view of another example motor mounting assembly of the disclosure. As illustrated in FIG. 2 the assembly 100 includes a third grommet 210 having a cylindrical shank 212 with an axial opening 214 located around the inner mounting sleeve shank 104 and distal the end 106 of the inner mounting sleeve 102 that is configured to be mounted to the support structure 108. Third grommet 210 can perform a function similar to that of the inner grommet flange 140, in embodiments where the inner grommet 112 does not include a flange. The third grommet 210 helps absorb the forces transmitted through the mounting arm 126. Similar to the embodiment shown in FIG. 1, the outer ring sleeve 118 can include a collar 144 that can contact and stabilize the third grommet 210, and, the third grommet collar 144 cooperate to absorb forces imparted from the motor mounting arm 126.

To suppress vibrating and acoustic noise some embodiments of the inner grommet 112 (and third grommet 210, when present) are preferably composed of a soft elastomeric material. For instance, in some cases the inner grommet 112 (or third grommet 210) is composed of an elastomer having a durometer hardness in the range of 30 Shore A to 40 Shore A. For instance, in some cases, the inner grommet 112 (or third grommet 210) is composed of an ethylene propylene diene monomer rubber. Based on the present disclosure one skilled in the art would appreciate other types of materials that would be appropriate to use.

Some embodiments of the outer grommet 128 are composed of a material that is still flexible but stiffer to provide mechanical stability. For instance, in some cases the outer grommet 128 is composed of an elastomer having durometer hardness scale in a range of 55 Shore A to 65 Shore A. For instance in some cases the outer grommet 128 is composed of an styrene butadiene rubber. Based on the present disclosure one skilled in the art would appreciate other types of materials that would be appropriate to use.

The material selection of the outer grommet 128 can affect the vibration damping properties of the assembly 100. The outer grommet 128 material preferably has some elasticity enabling it to be used as another element for tuning the vibration damping and suppression at frequencies that the inner grommet 112 may be unable to address because of the limited range of vibration suppression associated with its given selected material properties. The outer grommet 128 material is preferably durable enough to withstand repeated applied loads without failure and avoid long term creep. Such movement can result in a loss in blower performance and the wheel eventually rubbing against the blower housing. The outer grommet 128 can also provide mechanical support to the inner grommet 112, such as when the motor of the assembly is in a horizontal plane.

As further illustrated in FIG. 1, in some embodiments, the inner mounting sleeve 102 has an axial opening 146 running there-through (e.g., through the shank 104 and flange 138, when present). The axial opening 146 can be configured to hold a fastener 148 therein, and the fastener 148 can connect the assembly 100 to the support structure 108. For instance in some cases the fastener 148 can be configured as a thread screw, or bolt and nut pair that mounts to the support structure 108. In some cases, the fastener 148 can include a washer 150 that can help to further stabilize the inner grommet 112, and when present, the inner grommet flange 140 or third grommet 210.

As also illustrated in FIG. 1, in some embodiments of assembly 100, the end of the inner mounting sleeve 102 and the outer grommet 128 are configured to be mounted closer to the support structure 108 than the eyelet opening 124 of the mounting arm 126. In some such embodiments, the opposite end 152 of the inner mounting sleeve, the end of the outer ring sleeve having the collar 144 and the end of the inner grommet having the flange 140 are all configured to be mounted farther away from the support structure 108 than the eyelet opening 124. That is, the eyelet opening 124 is in-between the outer grommet 128 and the inner grommet flange 140 and outer ring sleeve collar 144.

In some embodiments it is desirable for the outer ring sleeve shank 114 to be large enough to easily slide through the eyelet opening 124 but not too large to allow excessive movement of the mounting arm 126 secured by the assembly. It can also desirable to allow the mounting arm 126 rotate in a direction that is parallel to the surface of the support structure as this can help redirect and redistribute vibratory energy to minimize damage to the inner grommet 112 caused by bending moments and to allow more effective suppression of vibration.

Figure 3:
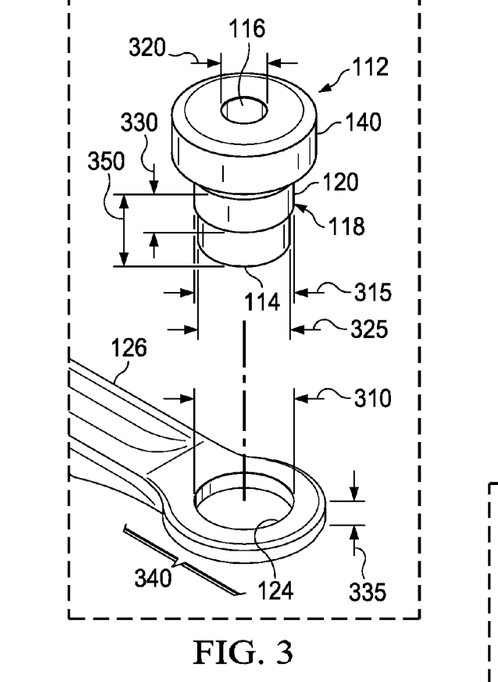
FIG. 3 presents a detailed isometric view of portions of an example assembly, similar to that depicted in FIG. 1.

For instance, as shown in detailed isometric view in FIG. 3, in some cases, an inner diameter 310 of the eyelet opening 124 is about 0.1 to 1 percent larger than an outer diameter 315 of the outer ring sleeve shank 120. For instance, in some cases when the eyelet opening diameter 310 equal 0.750 inches then the outer ring sleeve shank diameter 315 equals 0.744±0.005 inches.

The inner mounting sleeve 102 and outer ring sleeve 118 are important to preventing shipping damage and long-term changes in shape of the inner grommet 112 (and third grommet 210, when present). To facilitate these functions it is desirable for the outer and inner sleeves 102, 118, to be sized for appropriate unloaded compression of inner grommet 112 to minimize the effects of creep. In some cases, the outer and inner sleeves 102, 118, can be sized to tune the grommet's mechanical properties to suppress specific frequency vibrations transmitted to the assembly 100. In particular, the stiffness of the inner grommet 112 can be tuned by adjusting the amount of compression applied to grommet 112. By selecting the relative diameters of the outer and inner sleeves 102, 118, the grommet's 112 stiffness can be altered thereby allowing the assembly 100 to be fine-tuned to dampen selected pure tone frequencies.

Figure 4:
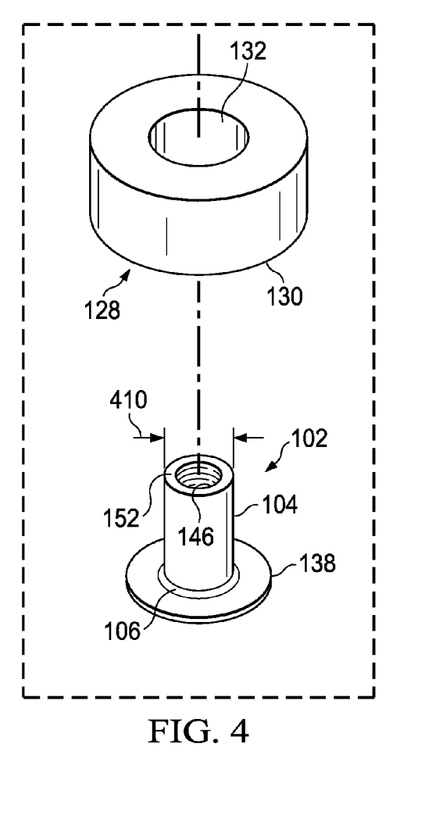
FIG. 4 presents a detailed isometric view of other portions of an example assembly, similar to that depicted in FIG. 1.

For instance, in some cases, as shown in detailed isometric views in FIGS. 3 and 4, a diameter 320 of the axial opening 116 of the inner grommet 112 is about 0.1 to 1 percent larger than an outer diameter 410 of the inner mounting sleeve shank 104. For instance, in some cases, the inner diameter 315 of the outer ring sleeve shank 120 is about 0.1 to 1 percent larger than an outer diameter 325 of the inner grommet shank 114.

The mounting arm 126 can move considerable distances along the inner grommet shank 114 resulting in tearing and abrading of grommet 112 until it is destroyed. Referring to FIG. 3, in some embodiments, it is desirable for the long axis length 330 of the outer ring sleeve 118 to be greater than a thickness 335 of a mounting arm portion 340 that defines the eyelet opening 124. Consequently, the motor arm portion 340 moves along the hard surface of the outer ring sleeve 118 rather than digging into the grommet 112 or stretching the grommet 112, e.g., as the mounting arm 126 applies a bending moment.

Additionally, the stiffness of inner grommet 112 and outer grommet 128 can be tuned by adjusting the lengths of the inner mounting sleeve 102 and the outer ring sleeve 118 to thereby fine-tune assembly 100 to dampen selected pure tone frequencies. For instance, in some embodiments, the long axis length 330 of the outer ring sleeve 118 is in a range of 1.1 to 10 times greater and in some cases 2 to 5 times greater than a thickness 335 of the mounting arm portion 340.

The relative lengths of the inner grommet 112 and outer grommet 128 can also be adjusted to thereby mitigate shipping and long-term creep damage to the inner grommet 112 and to fine-tune assembly 100 to dampen selected pure tone frequencies. For instance, referring to FIGS. 3 and 4, in some embodiments, the inner grommet shank 114 has a long axis length 350 in a range of about 1 to 5 times longer than a long axis length 330 of the outer ring sleeve shank 120.

Figure 5:
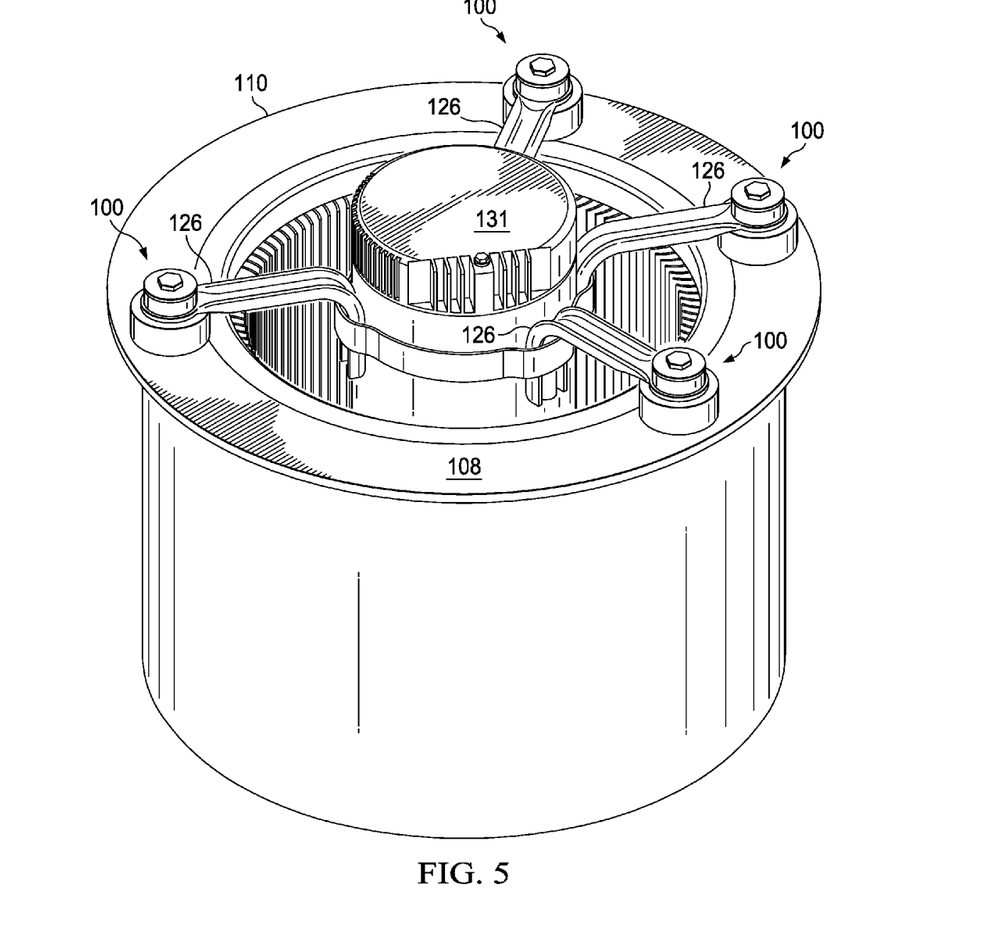
FIG. 5 presents a perspective view of another example motor mounting assembly of the disclosure mounting a motor to a supporting structure of a motorized device.

FIG. 5 presents a perspective view of another example motor mounting assembly 100 of the disclosure depicting the attachment of a motor 131 to a supporting structure 108 of a motorized device 110.

In the example embodiment illustrated, several assemblies 100 are used to attach an electronically commutated motor 131 to a supporting structure 108, which in this case, is the outer housing of a motorized device 110, which is this case, is an air mover (e.g., centrifugal blower) of a space conditioning system. The electronically commutated motor, in particular, can generate pulsations that can lead to system vibrations. Forces associated with the electrical and physical characteristics of this type of motor, coupled with its capability to operate over a wide range of speeds, offer many opportunities to transmit vibratory forces to other elements of the system causing them to vibrate and generate noise. Pure tone noise at specific frequencies can be very objectionable to end users of the system. Other embodiments of the motorized device 110 include, e.g., other motor driven component devices of an HVAC system such as an air mover, compressor, refrigerant circulating pump, or, other types of motorized device that can generate vibrations and associated acoustic noise.

Figure 6:
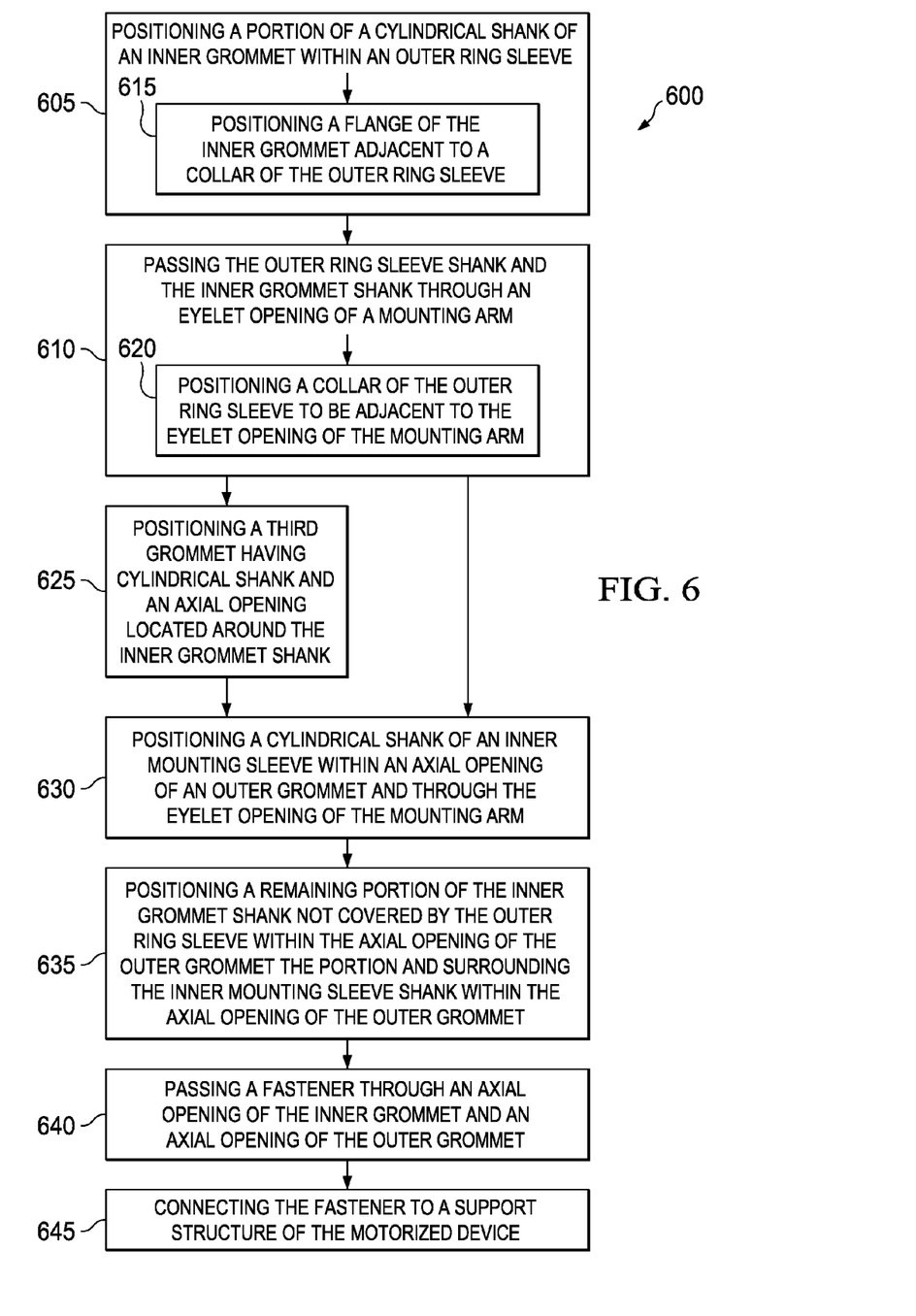
FIG. 6 presents a flow diagram of an example method of mounting a motorized device of the disclosure, using any of embodiments of the mounting assembly, such as any of the assemblies and motorized devices discussed in the context of FIGS. 1-5.

Another embodiment of the present disclosure is a method of mounting a motorized device using the mounting assembly of the disclosure. FIG. 6 presents a flow diagram of an example method 600 of mounting a motorized device of the disclosure, using any of embodiments of the mounting assembly, such as using any of the assemblies 100 to mount any of the motors 131 of the motorized devices 110, such as discussed in the context of FIGS. 1-5.

With continuing reference to FIGS. 1-5 throughout, as illustrated in FIG. 6, the method 600 comprises a step 605 of positioning a portion 122 of a cylindrical shank 114 of an inner grommet 112 within an outer ring sleeve 118 having a cylindrical shank 120, the outer ring sleeve 118 disposed around the portion 122 of the inner grommet shank 114. The method further comprises a step 610 of passing the outer ring sleeve shank 120 and the inner grommet shank 114 through an eyelet opening 124 of a mounting arm 126, wherein the shank 120 of the outer ring sleeve 118 is adjacent to the eyelet opening 124.

In some embodiments of the method 600, the positioning step 605 further includes a step 615 of positioning a flange 140 of the inner grommet 112 adjacent to a collar 144 of the outer ring sleeve 118.

In some embodiments of the method 600, the passing step 610 further includes a step 620 of positioning a collar 144 of the outer ring sleeve 118 to be adjacent to the eyelet opening 124 of the mounting arm 126, e.g., such that the mounting arms portion 340 that define the eyelet opening 124 does not touch any portion of the inner grommet flange 140.

Some embodiments of the method 600 further include a step 625 of positioning a third grommet 210 having cylindrical shank 212 and an axial opening 214 located around the inner grommet shank 114 and adjacent to an end 165 of the inner grommet shank 114. Referring to FIG. 2, when the assembly 100 is fully assembled, a third grommet 210 is distal to an end 106 of an inner mounting sleeve 102 that is configured to be mounted to the support structure 108.

Some embodiments of the method 600 further include a step 630 of positioning a cylindrical shank 104 of an inner mounting sleeve 102 within an axial opening 132 of an outer grommet 128 and through the eyelet opening 124 of the mounting arm 128, and, a step 635 of positioning a remaining portion 160 of the inner grommet shank 114 not covered by the outer ring sleeve 118 within the axial opening 132 of the outer grommet 128 the portion 160 and surrounding the inner mounting sleeve shank 104 within the axial opening 132 of the outer grommet 128.

Some embodiments of the method 600 further include a step 640 of passing a fastener 148 through an axial opening 116 of the inner grommet 118 and an axial opening 132 of the outer grommet 128, and a step 645 of connecting the fastener 148 to a support structure 108 of the motorized device 110 such that the inner mounting sleeve 102 is mounted to the support structure 108 and the mounting arm 126 thereby couples a motor 131 of the motorized device 110 to the support structure 108.

Figure 7:
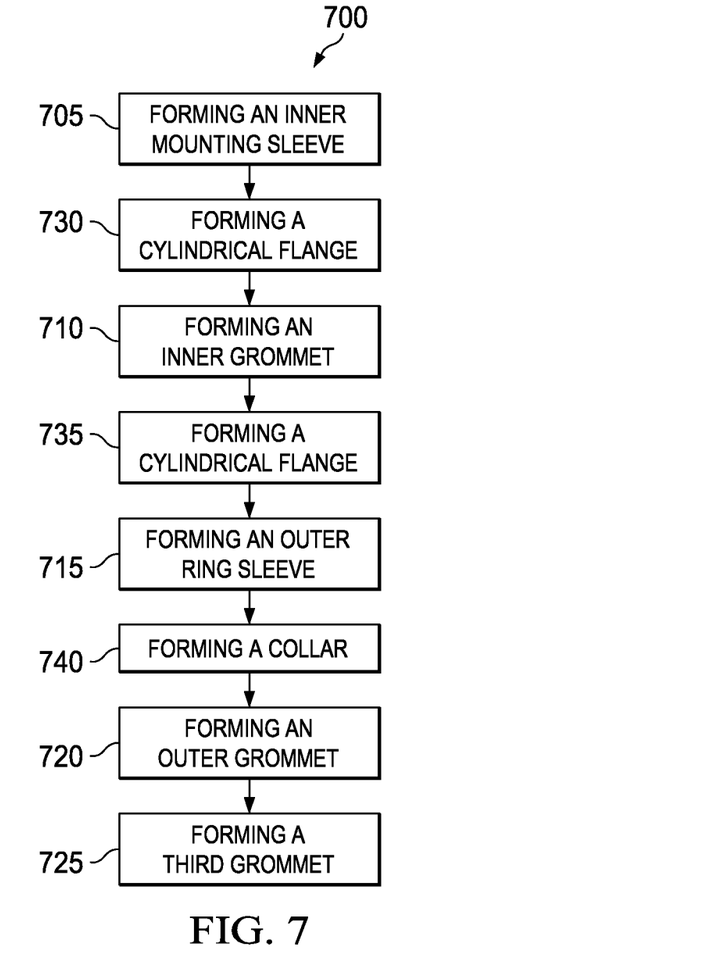
FIG. 7 presents a flow diagram of an example method of manufacturing mounting assembly, such as any of the assemblies discussed in the context of FIGS. 1-5.

Another embodiment of the present disclosure is a method of manufacturing a mounting assembly. FIG. 7 presents a flow diagram of an example method 700 of manufacturing a mounting assembly 100, such as any of the assemblies discussed in the context of FIGS. 1-5.

With continuing reference to FIGS. 1-5 throughout, as illustrated in FIG. 7, the method 700 comprises a step 705 of forming an inner mounting sleeve 102 having a cylindrical shank 104, wherein an end 106 of the inner mounting sleeve is configured to be mounted to a support structure 108 of a motorized device 110. The method 700 also comprises a step 710 of forming an inner grommet 112 having a cylindrical shank 114, an axial opening 116 of the inner grommet shank 114 configured to accommodate the mounting sleeve shank 104 there-through. The method 700 further comprises a step 715 forming an outer ring sleeve 118 having a cylindrical shank 120, the outer ring sleeve 118 disposed around a portion 122 of the inner grommet shank 114, the outer ring sleeve shank 120 configured to accommodate an eyelet opening 124 of a mounting arm 126 there-around. The method 700 also comprises a step 720 of forming an outer grommet 128 having a cylindrical shank 130, an axial opening 132 of the outer grommet shank 130 configured to accommodate the inner grommet shank 114 there-in.

Some embodiments of the method 700 further include a step 725 of forming a third grommet 210 having a cylindrical shank 212 and an axial opening 214 configured to be located around the inner grommet shank 114 and adjacent to an end 165 of the inner grommet shank 114 that is distal to the end 106 of the inner mounting sleeve 102 that is configured to be mounted to the support structure 108.

In some embodiments of the method 700, the step 705 of forming the inner mounting sleeve further includes a step 730 of forming a cylindrical flange 138 on the one end 106 that is configured to be mounted to the support structure 108.

In some embodiments of the method 700, the step 710 of forming the inner grommet 112 further includes a step 735 of forming a cylindrical flange 140 on an end 165 of the inner grommet shank 114. As discussed in the context of FIG. 1 the end 165 having the flange 140 can be positioned in the assembly 100 so as to be distal to the end 106 of the inner mounting sleeve 102 that is configured to be mounted to the support structure 108.

In some embodiments of the method 700, the step 715 of forming the outer ring sleeve 118 further includes a step 740 of forming a collar 144 on one end of the outer ring sleeve 118. As discussed in the context of FIG. 1 the outer ring sleeve 118 can be positioned in the assembly 100 such that the collar 144 is distal to the end 106 of the inner mounting sleeve 102 that is configured to be mounted to the support structure 108.

Those skilled in the art to which this application relates will appreciate that other and further additions, deletions, substitutions and modifications may be made to the described embodiments.

What is claimed is:

1. A mounting assembly, comprising:
   an inner mounting sleeve having a cylindrical shank, wherein an end of the mounting sleeve is configured to be mounted to a support structure of a motorized device;
   an inner grommet having a cylindrical shank, an axial opening of the inner grommet shank configured to accommodate the mounting sleeve shank there-through;
   an outer ring sleeve having a cylindrical shank, the outer ring sleeve disposed around a portion of the inner grommet shank, the outer ring sleeve shank configured to accommodate an eyelet of a mounting arm there-around; and
   an outer grommet having a cylindrical shank, an axial opening of the outer grommet shank configured to accommodate the inner grommet shank there-in, wherein the end of the inner mounting sleeve and the outer grommet are configured to be mounted closer to the support structure than the eyelet.

2. The mounting assembly of claim 1, wherein the inner mounting sleeve further includes a cylindrical flange on the end that is configured to be mounted to the support structure, the inner mounting sleeve flange configured to contact an outer surface of the support structure.

3. The mounting assembly of claim 1, wherein one end of the outer ring sleeve includes a collar, the outer ring sleeve situated in the assembly so that the one end with the collar is distal to the end of the inner mounting sleeve that is configured to be mounted to the support structure.

4. The mounting assembly of claim 1, wherein the inner mounting sleeve has an axial opening, the axial opening configured to hold a fastener therein, wherein a fastening pin connects the assembly to the support structure.

5. The mounting assembly of claim 1, wherein an inner diameter of the eyelet is about 0.1 to 1 percent larger than an outer diameter of the outer ring sleeve shank.

6. The mounting assembly of claim 1, wherein a diameter of the axial opening of the inner grommet is about 0.1 to 1 percent larger than an outer diameter of the inner mounting sleeve shank, and the inner diameter of the outer ring sleeve shank is about 0.1 to 1 percent larger than an outer diameter of the inner grommet shank.

7. The mounting assembly of claim 1, wherein a long axis length of the outer ring sleeve is greater than a thickness of a portion the mounting arm that defines the eyelet.

8. The mounting assembly of claim 1, wherein the inner grommet shank has a long axis length in a range of about 1 to 5 times longer than a long axis length of the outer ring sleeve shank.

9. The mounting assembly of claim 1, wherein the mounting arm attaches an electronically commutated motor of the motorized device to the support structure of the motorized device.

10. A mounting assembly, comprising:
an inner mounting sleeve having a cylindrical shank, wherein an end of the mounting sleeve is configured to be mounted to a support structure of a motorized device;
an inner grommet having a cylindrical shank, an axial opening of the inner grommet shank configured to accommodate the mounting sleeve shank there-through;
an outer ring sleeve having a cylindrical shank, the outer ring sleeve disposed around a portion of the inner grommet shank, the outer ring sleeve shank configured to accommodate an eyelet of a mounting arm there-around; and
an outer grommet having a cylindrical shank, an axial opening of the outer grommet shank configured to accommodate the inner grommet shank there-in, wherein the inner grommet includes a cylindrical flange on an end of the inner grommet shank that is distal to the end of the inner mounting sleeve that is configured to be mounted to the support structure.

11. A mounting assembly, comprising:
an inner mounting sleeve having a cylindrical shank, wherein an end of the mounting sleeve is configured to be mounted to a support structure of a motorized device;
an inner grommet having a cylindrical shank, an axial opening of the inner grommet shank configured to accommodate the mounting sleeve shank there-through;
an outer ring sleeve having a cylindrical shank, the outer ring sleeve disposed around a portion of the inner grommet shank, the outer ring sleeve shank configured to accommodate an eyelet of a mounting arm there-around;
an outer grommet having a cylindrical shank, an axial opening of the outer grommet shank configured to accommodate the inner grommet shank there-in; and
a third grommet having a cylindrical shank with an axial opening located around the inner grommet shank and distal to the end of the inner mounting sleeve that is configured to be mounted to the support structure.

12. A method of mounting a motorized device using a mounting assembly, comprising:
positioning a portion of a cylindrical shank of an inner grommet having an axial opening within an outer ring sleeve having a cylindrical shank, the outer ring sleeve disposed around the portion of the inner grommet cylindrical shank;
passing the outer ring sleeve shank and the inner grommet shank through an eyelet of a mounting arm, wherein the shank of the outer ring sleeve is adjacent to the eyelet;
positioning a cylindrical shank of an inner mounting sleeve within the axial opening of the inner grommet;
positioning another portion of the inner grommet shank, not covered by the outer ring sleeve, within an axial opening of a cylindrical shank of an outer grommet; and
mounting an end of the inner mounting sleeve to a support structure of the motorized device wherein the end of the inner mounting sleeve and the outer grommet are configured to be mounted closer to the support structure than the eyelet.

13. The method of claim 12, wherein positioning the portion of the cylindrical shank of the inner grommet within the outer ring sleeve further includes positioning a flange located on an end of the cylindrical shank of the inner grommet adjacent to a collar of the outer ring sleeve, wherein the flange is distal to the end of the inner mounting sleeve that is mounted to the support structure.

14. The method of claim 12, wherein passing the outer ring sleeve shank and the inner grommet shank through the eyelet of the mounting arm, further includes positioning a collar of the outer ring sleeve adjacent to the eyelet of the mounting arm.

15. The method of claim 12, further including positioning a third grommet having cylindrical shank with an axial opening located around an end of the inner grommet shank, wherein the flange is distal to the end of the inner mounting sleeve that is mounted to the support structure.

16. A method of manufacturing a mounting assembly, comprising:
forming an inner mounting sleeve having a cylindrical shank, wherein an end of the inner mounting sleeve is configured to be mounted to a support structure of a motorized device;
forming an inner grommet having a cylindrical shank, a axial opening of the inner grommet shank configured to accommodate the mounting sleeve shank there-through;
forming an outer ring sleeve having a cylindrical shank, the outer ring sleeve disposed around a portion of the inner grommet shank, the outer ring sleeve shank configured to accommodate an eyelet of a mounting arm there-around; and
forming an outer grommet having a cylindrical shank, a axial opening of the outer grommet shank configured to accommodate the inner grommet shank there-in, wherein the end of the inner mounting sleeve and the outer grommet are configured to be mounted closer to the support structure than the eyelet.

17. The method of claim 16, forming the inner mounting sleeve includes forming a cylindrical flange on the end that is configured to be mounted to the support structure.

18. A method of manufacturing a mounting assembly, comprising:
forming an inner mounting sleeve having a cylindrical shank, wherein an end of the inner mounting sleeve is configured to be mounted to a support structure of a motorized device;
forming an inner grommet having a cylindrical shank, an axial opening of the inner grommet shank configured to accommodate the mounting sleeve shank there-through;
forming an outer ring sleeve having a cylindrical shank, the outer ring sleeve disposed around a portion of the inner grommet shank, the outer ring sleeve shank configured to accommodate an eyelet opening of a mounting arm there-around;
forming an outer grommet having a cylindrical shank, an axial opening of the outer grommet shank configured to accommodate the inner grommet shank there-in; and
forming a third grommet having a cylindrical shank and an axial opening configured to be located around the inner grommet shank and adjacent to an end of the inner grommet shank that is distal to the end of the inner mounting sleeve that is configured to be mounted to the support structure.

19. A method of manufacturing a mounting assembly, comprising:

forming an inner mounting sleeve having a cylindrical shank, wherein an end of the inner mounting sleeve is configured to be mounted to a support structure of a motorized device;

forming an inner grommet having a cylindrical shank, an axial opening of the inner grommet shank configured to accommodate the mounting sleeve shank there-through, wherein forming the inner grommet includes forming a cylindrical flange on an end of the inner grommet shank, wherein the cylindrical flange is distal to the end of the inner mounting sleeve that is configured to be mounted to the support structure;

forming an outer ring sleeve having a cylindrical shank, the outer ring sleeve disposed around a portion of the inner grommet shank, the outer ring sleeve shank configured to accommodate an eyelet of a mounting arm there-around; and forming an outer grommet having a cylindrical shank, an axial opening of the outer grommet shank configured to accommodate the inner grommet shank there-in.

* * * * *